United States Patent
Rao et al.

(10) Patent No.: US 11,223,679 B2
(45) Date of Patent: Jan. 11, 2022

(54) HOST DEVICE WITH MULTI-PATH LAYER CONFIGURED FOR DETECTION AND REPORTING OF PATH PERFORMANCE ISSUES

(71) Applicant: EMC IP Holding Company LLC, Hopkinton, MA (US)

(72) Inventors: Vinay G. Rao, Bangalore (IN); Sanjib Mallick, Bangalore (IN); Krishna Deepak Nuthakki, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 66 days.

(21) Appl. No.: 16/035,785

(22) Filed: Jul. 16, 2018

(65) Prior Publication Data
US 2020/0021654 A1    Jan. 16, 2020

(51) Int. Cl.
*G06F 15/173* (2006.01)
*H04L 29/08* (2006.01)

(52) U.S. Cl.
CPC ...... *H04L 67/1097* (2013.01); *H04L 67/1002* (2013.01)

(58) Field of Classification Search
CPC ................ H04L 67/1097; H04L 67/1002
USPC ........................................................ 709/224
See application file for complete search history.

(56) References Cited

U.S. PATENT DOCUMENTS

| 6,687,746 | B1  | 2/2004  | Shuster et al. |
| 6,697,875 | B1  | 2/2004  | Wilson |
| 7,454,437 | B1  | 11/2008 | Lavallee et al. |
| 7,668,981 | B1* | 2/2010  | Nagineni ............ H04L 41/0896 710/15 |
| 7,818,428 | B1  | 10/2010 | Lavallee et al. |
| 7,925,872 | B2  | 4/2011  | Lai et al. |
| 8,819,307 | B1* | 8/2014  | Raizen ................. G06F 3/0635 709/238 |

(Continued)

OTHER PUBLICATIONS

VMWARE, "Multipathing Configuration for Software iSCSI Using Port Binding," Technical White Paper, Apr. 25, 2012, 15 pages.

(Continued)

*Primary Examiner* — Hannah S Wang
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to send a predetermined command to the storage system over each of a plurality of paths from the host device to the storage system, to monitor a response time for the predetermined command on each of the paths, and to detect a performance issue with at least a given one of the paths based at least in part on the monitored response time. The predetermined command illustratively comprises a Small Computer System Interface (SCSI) "immediate" command of a particular type, such as a Test Unit Ready (TUR) command.

20 Claims, 2 Drawing Sheets

(56) References Cited

U.S. PATENT DOCUMENTS

| | | | |
|---|---|---|---|
| 9,594,780 | B1 | 3/2017 | Esposito et al. |
| 9,778,852 | B1 | 10/2017 | Marshak et al. |
| 2004/0010563 | A1 | 1/2004 | Forte et al. |
| 2008/0043973 | A1 | 2/2008 | Lai et al. |
| 2008/0147893 | A1* | 6/2008 | Marripudi ............ G06F 3/0613 710/5 |
| 2009/0006780 | A1* | 1/2009 | Sato .................... G06F 3/0607 711/154 |
| 2011/0161520 | A1* | 6/2011 | Horiuchi ............... G06F 11/201 709/244 |
| 2011/0197027 | A1 | 8/2011 | Balasubramanian et al. |
| 2013/0121161 | A1* | 5/2013 | Szabo ................. H04L 43/0876 370/241 |
| 2014/0310401 | A1* | 10/2014 | Thomas .............. H04L 41/5003 709/224 |
| 2015/0319245 | A1* | 11/2015 | Nishihara ............. G06F 3/0604 709/213 |
| 2016/0117113 | A1 | 4/2016 | Li et al. |
| 2016/0246749 | A1* | 8/2016 | Kobashi .............. G06F 13/4022 |
| 2017/0220406 | A1* | 8/2017 | Parnell .................... G06F 11/08 |
| 2018/0004425 | A1* | 1/2018 | Suzuki ................... G06F 13/10 |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653, filed in the name of Maneesh Pusalkar et al. Oct. 27, 2017 and entitled "Storage System with Network-Wide Configurable Device Names."

U.S. Appl. No. 15/849,828, filed in the name of Sanjib Mallick et al. Dec. 21, 2017 and entitled "Storage System with Input-Output Performance Control Utilizing Application Process Detection."

NVM Express, "NVMe Specification," Revision 1.3, May 1, 2017, 282 pages.

* cited by examiner

HOST DEVICE WITH MULTI-PATH LAYER CONFIGURED FOR DETECTION AND REPORTING OF PATH PERFORMANCE ISSUES

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. For example, such degradations can arise when paths are added or deleted as a result of zoning and masking changes or other types of storage system reconfigurations performed by a storage administrator or other user. Also, as the number of host devices and the complexity of the shared storage system increases, the number of paths between the host devices and the storage system increases, making it even more difficult to detect performance issues that may be attributable to particular paths. Performance issues that are particularly difficult to detect under conventional practice include "slow drain" issues potentially arising from imbalances in supported data rates between host devices, network switches and storage arrays. Hardware problems and noisy communication lines can also lead to path performance issues that are very difficult to detect. It is also difficult in many such cases for a host administrator to distinguish between a path performance issue and a storage system issue. As a result, much time can be wasted under current practice in troubleshooting a storage system responsive to an apparent performance issue when the actual problem is in one or more of the paths.

SUMMARY

Illustrative embodiments configure a multi-path layer of one or more host devices to include functionality for detection and reporting of path performance issues in a storage area network (SAN) or other type of network over which the one or more host devices communicate with a storage array or other type of storage system. The multi-path layer illustratively comprises at least one multi-path input-output (MPIO) driver configured to process input-output (TO) operations of at least one host device. The multi-path layer in such arrangements can be configured to continuously monitor the response time of the paths and to map detected performance degradations of one or more paths to particular host devices and applications that are impacted by the degradation.

Such embodiments allow a host administrator to more efficiently address any path performance issues that arise. For example, a given impacted application can be automatically migrated to another host device that is not affected by the problematic path or paths until the path performance issues are resolved. Moreover, illustrative embodiments directly detect and report path performance issues, thereby avoiding any wasted time that might otherwise have been spent in troubleshooting the storage system.

In one embodiment, an apparatus comprises a host device configured to communicate over a network with a storage system comprising a plurality of storage devices. The host device includes a set of IO queues and an MPIO driver configured to select IO operations from the set of IO queues for delivery to the storage system over the network. The MPIO driver is further configured to send a predetermined command to the storage system over each of a plurality of paths from the host device to the storage system, to monitor a response time for the predetermined command on each of the paths, and to detect a performance issue with at least a given one of the paths based at least in part on the monitored response time.

The paths from the host device to the storage system for which performance issues are detected in some embodiments comprise respective SAN paths, although other types of network paths can be used in other embodiments. The paths illustratively comprise paths associated with respective initiator-target pairs.

The predetermined command illustratively comprises a particular type of command selected to elicit a substantially immediate response from the storage system such that the monitored response time is primarily comprised of path delay rather than storage system delay. For example, in some embodiments the predetermined command comprises a Small Computer System Interface (SCSI) command of a particular type, such as a Test Unit Ready (TUR) command, an Inquiry command, or a Read Capacity command. A wide variety of other types of SCSI or non-SCSI "immediate" commands that elicit a substantially immediate response from the storage system can be used, including vendor unique commands.

In some embodiments, detecting a performance issue in the MPIO driver comprises determining a current response time for the given path from a response by the storage system to a current instance of the predetermined command, comparing the current response time to a previous response time for the given path as determined from a response by the storage system to a previous instance of the predetermined command, and responsive to the current response time being greater than the previous response time by more than a threshold amount, detecting the performance issue with the given path.

Additionally or alternatively, the MPIO driver may be further configured to identify a particular one of the storage devices associated with the given path for which a performance issue is detected, to map the particular storage device to at least one process that generates IO operations directed to the particular storage device, and to generate a notification identifying the process so as to permit the process to be mapped to a particular application running on the host device.

In some embodiments, an application comprising at least one process generating IO operations directed to a particular one of the storage devices associated with the given path is migrated from a host device that utilizes the given path to another host device that does not utilize the given path.

The host device in some embodiments is configured to generate a notification for delivery to a host administrator responsive to detection of the performance issue with the given path. The host device may additionally or alternatively be configured to generate a notification for delivery to the storage system responsive to detection of the performance issue with the given path.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
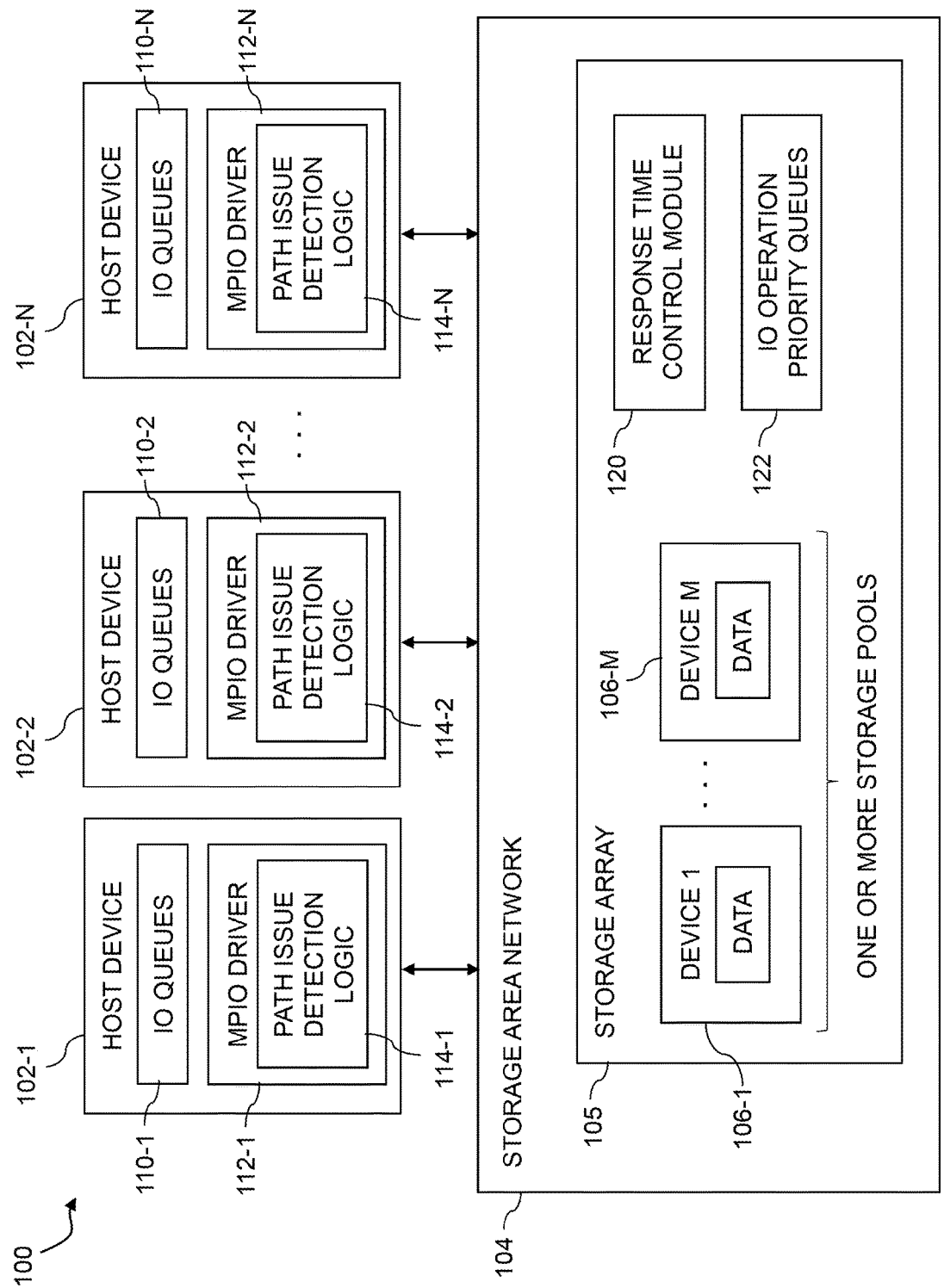
FIG. 1 is a block diagram of an information processing system configured with functionality for detection and reporting of path performance issues utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for detection and reporting of path performance issues using respective instances of path issue detection logic 114-1, 114-2, . . . 114-N implemented within the MPIO drivers 112.

The MPIO drivers 112 may comprise, for example, otherwise conventional MPIO drivers, such as PowerPath drivers from Dell EMC, suitably modified in the manner disclosed herein to detect and report path performance issues. Other types of MPIO drivers from other driver vendors may be suitably modified to incorporate functionality for detection and reporting of path performance issues as disclosed herein.

The MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 is further configured to send a predetermined command to the storage array 105 over each of a plurality of paths from the host device 102-1 to the storage array 105, to monitor a response time for the predetermined command on each of the paths, and to detect a performance issue with at least a given one of the paths based at least in part on the monitored response time.

The predetermined command may be sent periodically over the paths, or under other specified conditions suitable for efficient monitoring of response times. In some embodiments, the predetermined command may be sent on each of the paths in each of a plurality of different periods of time. The different periods of time need not be of the same duration, and the particular set of paths over which the predetermined command is sent can vary from period to period. A more detailed example of an arrangement of this type is described below in conjunction with the embodiment of FIG. 2.

The predetermined command illustratively comprises a particular type of command selected to elicit a substantially immediate response from the storage array 105 such that the monitored response time is primarily comprised of path delay rather than storage array delay. Such a command is also referred to herein as an "immediate" command, as it elicits a substantially immediate response from the storage array 105, thereby allowing the MPIO driver 112-1 to utilize the monitored response time for a given one of the paths to characterize the delay of the given path.

In some embodiments, the predetermined command comprises a SCSI command of a particular type. For example, the predetermined command may comprise at least one of a Test Unit Ready (TUR) command, an Inquiry command, and a Read Capacity command. These are all examples of SCSI "immediate" commands.

Other types of SCSI or non-SCSI commands may be used in other embodiments, including commands that are part of a standard command set, or custom commands such as a "vendor unique command" or VU command that is not part of a standard command set. The term "predetermined command" as used herein is therefore intended to be broadly construed, so as to encompass, for example, a predetermined composite command that comprises a combination of multiple individual commands.

The paths over which the predetermined command is sent from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

As indicated previously, addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In detecting a performance issue for a given one of the paths based at least in part on its monitored response time to the predetermined command, the MPIO driver 112-1 is illustratively configured to determine a current response time for the given path from a response by the storage array 105 to a current instance of the predetermined command, to compare the current response time to a previous response time for the given path as determined from a response by the storage array 105 to a previous instance of the predetermined command, and responsive to the current response time being greater than the previous response time by more than a threshold amount, detecting the performance issue with the given path.

Alternative detection techniques based at least in part on monitored response time to one or more instances of the predetermined command can be used. For example, a performance problem for a given path may be detected if its monitored response time in a current period exceeds a specified threshold, without reference to a response time differential relative to any previous period.

The host device 102-1 may be configured to generate a notification for delivery to a host administrator responsive to detection of the performance issue with the given path.

Additionally or alternatively, the host device 102-1 may be configured to generate a notification for delivery to the storage array 105 responsive to detection of the performance issue with the given path.

Other types of reporting arrangements are utilized in other embodiments, some of which involve mapping of storage devices to processes and mapping of processes to applications. Examples of such arrangements will now be described.

In some embodiments, the MPIO driver 112-1 is configured to identify a particular one of the storage devices 106 associated with the given path for which a performance issue is detected, to map the particular storage device to at least one process that generates IO operations directed to the particular storage device, and to generate a notification identifying the process so as to permit the process to be mapped to a particular application running on the host device 102-1. Such a notification may be sent to a host administrator or may be automatically processed within the host device 102-1 to determine impacted applications.

Additionally or alternatively, the MPIO driver 112-1 in some embodiments is further configured to map the given path for which a performance issue is detected to a particular one of the host devices.

An application comprising at least one process generating IO operations directed to a particular one of the storage devices 106 associated with the given path may be migrated from one of the host devices 102 that utilizes the given path to another one of the host devices 102 that does not utilize the given path based at least in part on the mapping. Other types of automated actions may be taken based at least in part on mapping of storage devices to processes and/or mapping of processes to applications in other embodiments.

Mapping a detected path performance issue to a particular host and application allows the above-noted migration or other appropriate actions to be taken in an automated manner while the issue is further investigated and resolved understood and corrected. In some embodiments, VMware® VMotion™ is utilized to implement the live migration of running virtual machines from one physical server impacted by the problematic path to another physical server that is not impacted by the problematic path, with minimal downtime and continuous service availability, in response to a detected path performance issue.

The above-described functions associated with path performance issue detection and reporting functionality of the MPIO driver 112-1 are carried out at least in part under the control of its path issue detection logic 114-1. For example, the path issue detection logic 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for detection and reporting of path performance issues. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support detection and reporting of path performance issues.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of the path performance issue detection and reporting techniques in a multi-path layer as disclosed herein, it can be difficult to detect performance issues that may be attributable to particular paths, such as "slow drain" issues potentially arising from imbalances in supported data rates between host devices, network switches and storage arrays. Moreover, it is also very difficult for a host administrator to distinguish between a path performance issue and a storage system issue, leading to potential lost time in troubleshooting a storage system responsive to an apparent performance issue when the actual problem is in one or more of the paths.

Such drawbacks are advantageously overcome in illustrative embodiments herein by utilization of a multi-path layer comprising one or more of the MPIO drivers 112 to discover and report path performance issues as described above.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, now U.S. Pat. No. 10,474,367, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path issue detection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes.

Figure 2:
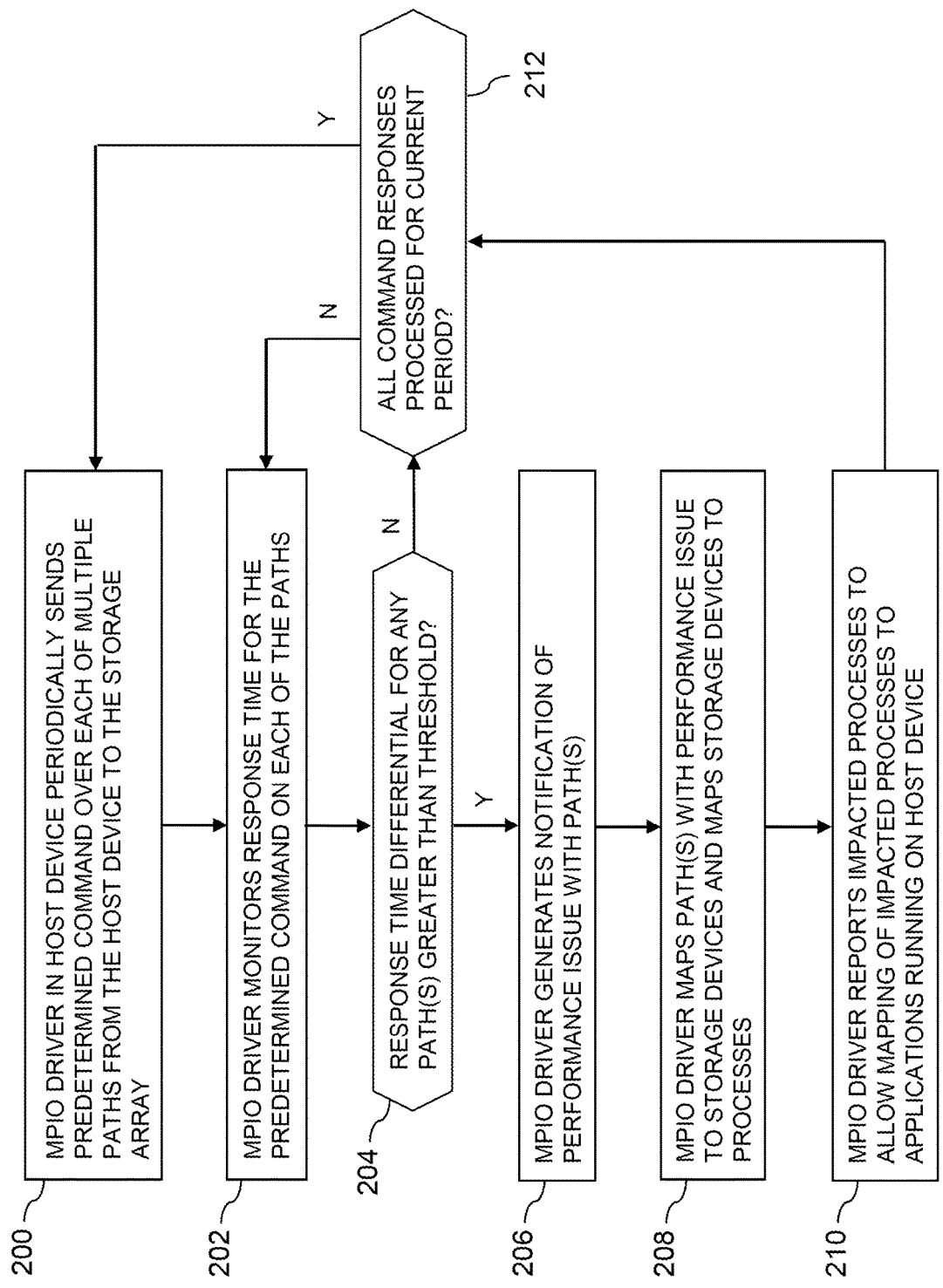
FIG. 2 is a flow diagram of a process for detection and reporting of path performance issues utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, the MPIO driver in the host device periodically sends a predetermined command over each of multiple paths from the host device to the storage array.

At least some of the paths from the host device to the storage array may be determined using an initial path discovery scan performed in conjunction with booting of the host device. It is assumed for the description of this embodiment that the host device has discovered a plurality of paths to the storage array, and further that at least one storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which the predetermined command is periodically sent by the host device to the storage array can change over time.

In step 202, the MPIO driver monitors response time for the predetermined command on each of the paths. For example, the MPIO driver can determine a transmit timestamp associated with transmission of the predetermined command over a given path, determine a receive timestamp associated with receipt of a response to the predetermined command over the given path, and compute the response time as the difference between the receive timestamp and the transmit timestamp. Numerous other techniques can be used to monitor response times for the predetermined command over respective ones of the paths between the host device and the storage array.

In step 204, a determination is made by the MPIO driver as to whether or not a response time differential for any particular path or paths is greater than a specified threshold. If there is at least one path for which the response time differential is greater than the threshold, the process moves to step 206, and otherwise moves to step 212.

For example, the detection of a performance issue with a given path in this embodiment illustratively comprises determining a current response time for the given path from the response by the storage array to a current instance of the predetermined command, comparing the current response time to a previous response time for the given path as determined from a response by the storage array to a previous instance of the predetermined command, and responsive to the current response time being greater than the previous response time by more than a threshold amount, detecting the performance issue with the given path. The difference between the current response time and the previous response time provides the above-noted response time differential in this example. Other performance issue detection techniques utilized in other embodiments can be based on the response time of a single period rather than on a differential response time between periods.

In step 206, the MPIO driver generates a notification of a performance issue with each of the paths for which the response time differential was greater than the threshold.

In step 208, the MPIO driver maps the path(s) with a performance issue to storage devices and maps the storage devices to processes. In other embodiments, the path or paths with a performance issue may map to a single storage device that is mapped to a single process. As indicated previously, the storage devices can include logical storage devices such as LUNs or other logical storage volumes. The mapping operation carried out in step 208 can therefore involve mapping of each path with a performance issue to one or more logical storage volumes of the storage array.

In step 210, the MPIO driver reports impacted processes in order to allow mapping of the impacted processes to applications running on the host device. Again, it is possible that there is only a single impacted process.

By way of example, the MPIO driver illustratively identifies a particular storage device associated with the given path for which a performance issue is detected, maps the particular storage device to at least one process that generates IO operations directed to the particular storage device, and generates a notification identifying the process so as to permit the process to be mapped to a particular application running on the host device.

In step 212, a determination is made by the MPIO driver as to whether or not command responses have been processed for all of the paths for the current period. If there is at least one path for which the response to the predetermined command has not yet been processed, the process returns to step 202, and otherwise returns to step 200.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and path performance issue discovery and reporting functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different path performance issue discovery and reporting arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for path performance issue detection and reporting in a multi-path layer will now be described. It is assumed in this embodiment that the MPIO driver of a given host device provides path performance issue detection and reporting functionality, under the control of a corresponding instance of path issue detection logic implemented in the MPIO driver.

In this example, the MPIO driver implements the following process within the given host device:

1. The MPIO driver sends a SCSI TUR command on each of multiple paths where each path corresponds to a different initiator-target pair. The TUR command is an example of what is more generally referred to herein as an "immediate command" which is answered by the receiving storage array port with almost no in-array processing.

2. The MPIO driver records the response time of the storage array port to the TUR command. As the TUR command is a type of immediate command, its response time is primarily attributable to SAN delay.

3. Steps 1 and 2 are repeated in each of multiple periods.

4. In a current one of the periods, the MPIO driver determines if the differential between the recorded response time and a response time previously recorded for a previous period exceeds a user-defined notification threshold. If the notification threshold is exceeded, the MPIO driver detects a path performance issue. The path performance is illustratively reported to the host administrator or other system user.

5. The MPIO driver maps the paths for target ports experiencing poor response time to the LUNs that are accessed on those ports.

6. The MPIO driver maps the LUNs identified in step 5 to those processes executing on the host device that generate IO operations for the identified LUNs. These processes can then be mapped to applications executing on the host device. One or more automated actions of the type described elsewhere herein may also be taken.

7. The MPIO driver reports path performance issues to the storage array. The storage array can then notify the appropriate storage administrator as well as "dial home" to ensure that storage array customer service personnel are prepared to address any customer queries relating to the path performance issues.

8. The MPIO driver also reports the monitored response times per initiator-target pair on a regular basis to the host administrator. This will allow the host administrator to validate that all of the paths from the host device to the storage array are experiencing similar response times, a condition indicative of a well-balanced SAN, and if not to make adjustments to return the SAN to a well-balanced condition.

As mentioned previously, different instances of the above-described process can be performed by different MPIO drivers in different host devices.

The particular path performance issue detection and reporting arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements. For example, some embodiments configure a multi-path layer of one or more host devices to include functionality for detection and reporting of path performance issues in a SAN or other type of network over which the one or more host devices communicate with a storage array or other type of storage system. The multi-path layer in such arrangements can be configured to continuously monitor the response time of the paths and to map detected performance degradations of one or more paths to particular host devices and applications that are impacted by the degradation.

Such embodiments allow a host administrator to more efficiently address any path performance issues that arise. For example, a given impacted application can be automatically migrated to another host device that is not affected by the problematic path or paths until the path performance issues are resolved. Moreover, illustrative embodiments directly detect and report path performance issues, thereby avoiding any wasted time that might otherwise have been spent in troubleshooting the storage system.

These and other arrangements are advantageously configured to provide efficient detection and reporting of path performance issues even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path issue detection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path issue detection logic and additional or alternative components. Also, the particular configurations of system and device elements and associated processing operations illustratively shown in the drawings can be varied in other embodiments. For example, a wide variety of different MPIO driver configurations and associated path performance issue detection and reporting arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device comprising a processor and a memory coupled to the processor and configured to communicate over a network with a storage system comprising a plurality of storage devices;
the host device further comprising:
a set of input-output queues; and
a multi-path input-output driver configured to select input-output operations from the set of input-output queues for delivery to the storage system over the network;
wherein the multi-path input-output driver is further configured:
to send a predetermined command to the storage system over each of a plurality of paths from the host device to the storage system;
to monitor a response time for the predetermined command on each of the paths;
to detect a performance issue with at least a given one of the paths based at least in part on the monitored response time;
to identify a particular one of the storage devices associated with the given path for which the performance issue is detected;
to map the particular storage device to at least one process that generates input-output operations directed to the particular storage device; and
to generate a notification identifying the process so as to permit the process to be mapped to a particular application running on the host device;
wherein the host device is further configured:
to map the process identified in the notification to the particular application; and
to perform at least one automated action relating to the particular application based at least in part on the notification identifying the process; and
wherein detecting a performance issue comprises:
determining a current response time for the given path from a response by the storage system to a current instance of the predetermined command;
determining a previous response time for the given path from a response by the storage system to a previous instance of the predetermined command;
comparing the current response time to the previous response time; and
responsive to the current response time being greater than the previous response time by more than a threshold amount, detecting the performance issue with the given path.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein the multi-path input-output driver is further configured to periodically send the predetermined command to the storage system over each of the plurality of paths.

4. The apparatus of claim 1 wherein the predetermined command comprises a particular type of command selected to elicit a response from the storage system.

5. The apparatus of claim 1 wherein the predetermined command comprises a Small Computer System Interface (SCSI) command of a particular type.

6. The apparatus of claim 1 wherein the predetermined command comprises at least one of a Test Unit Ready (TUR) command, an Inquiry command, a Read Capacity command and a vendor unique command.

7. The apparatus of claim 2 wherein a given one of the multi-path input-output drivers is further configured to map the given path for which a performance issue is detected to a particular one of the host devices.

8. The apparatus of claim 1 wherein the paths over which the predetermined command is sent comprise paths associated with respective initiator-target pairs.

9. The apparatus of claim 1 wherein the host device is configured to generate a notification for delivery to a host administrator responsive to detection of the performance issue with the given path.

10. The apparatus of claim 1 wherein the host device is configured to generate a notification for delivery to the storage system responsive to detection of the performance issue with the given path.

11. The apparatus of claim 1 wherein the multi-path input-output driver is further configured:
to select the input-output operations from the set of input-output queues for delivery to the storage system in accordance with a load balancing algorithm; and
to adjust the load balancing algorithm based at least in part on the detected performance issue.

12. A method comprising:
configuring a host device comprising a processor and a memory coupled to the processor;
configuring a multi-path input-output driver of the host device to communicate with a storage system over a network; and
configuring the multi-path input-output driver of the host device to implement:
sending a predetermined command to the storage system over each of a plurality of paths from the host device to the storage system;
monitoring a response time for the predetermined command on each of the paths;
detecting a performance issue with at least a given one of the paths based at least in part on the monitored response time;
identifying a particular one of the storage devices associated with the given path for which the performance issue is detected;
mapping the particular storage device to at least one process that generates input-output operations directed to the particular storage device; and
generating a notification identifying the process so as to permit the process to be mapped to a particular application running on the host device;
the method further comprising:
mapping the process identified in the notification to the particular application; and
performing at least one automated action relating to the particular application based at least in part on the notification identifying the process; and
wherein detecting a performance issue comprises:
determining a current response time for the given path from a response by the storage system to a current instance of the predetermined command;
determining a previous response time for the given path from a response by the storage system to a previous instance of the predetermined command;
comparing the current response time to the previous response time; and
responsive to the current response time being greater than the previous response time by more than a threshold amount, detecting the performance issue with the given path.

13. A computer program product comprising a non-transitory processor-readable storage medium having stored therein program code of one or more software programs, wherein the program code, when executed by a host device comprising a multi-path input-output driver, the host device being configured to communicate over a network with a storage system, the host device comprising a processor and a memory coupled to the processor, causes the multi-path input-output driver:

to send a predetermined command to the storage system over each of a plurality of paths from the host device to the storage system;

to monitor a response time for the predetermined command on each of the paths;

to detect a performance issue with at least a given one of the paths based at least in part on the monitored response time;

to identify a particular one of the storage devices associated with the given path for which the performance issue is detected;

to map the particular storage device to at least one process that generates input-output operations directed to the particular storage device; and to generate a notification identifying the process so as to permit the process to be mapped to a particular application running on the host device;

wherein the host device is further configured:

to map the process identified in the notification to the particular application; and to perform at least one automated action relating to the particular application based at least in part on the notification identifying the process; and wherein detecting a performance issue comprises:

determining a current response time for the given path from a response by the storage system to a current instance of the predetermined command;

determining a previous response time for the given path from a response by the storage system to a previous instance of the predetermined command;

comparing the current response time to the previous response time; and responsive to the current response time being greater than the previous response time by more than a threshold amount, detecting the performance issue with the given path.

14. The computer program product of claim 13 wherein the program code, when executed by the host device comprising the multi-path input-output driver, further causes the multi-path input-output driver:

to select input-output operations from a set of input-output queues for delivery to the storage system in accordance with a load balancing algorithm; and to adjust the load balancing algorithm based at least in part on the detected performance issue.

15. The method of claim 12 further comprising the multi-path input-output driver:

selecting input-output operations from a set of input-output queues for delivery to the storage system in accordance with a load balancing algorithm; and adjusting the load balancing algorithm based at least in part on the detected performance issue.

16. The method of claim 12 wherein the predetermined command comprises a particular type of command selected to elicit a response from the storage system.

17. The method of claim 12 wherein the particular application comprises at least one process generating input-output operations directed to a particular one of the storage devices associated with the given path, and wherein the at least one automated action relating to the particular application comprises initiating migration of the at least one process of the particular application from a first one of the host devices that utilizes the given path to a second one of the host devices that does not utilize the given path based at least in part on the mapping.

18. The method of claim 12 wherein the predetermined command comprises at least one of a Test Unit Ready (TUR) command, an Inquiry command, a Read Capacity command and a vendor unique command.

19. The apparatus of claim 1 wherein the particular application comprises at least one process generating input-output operations directed to a particular one of the storage devices associated with the given path, and wherein the at least one automated action relating to the particular application comprises initiating migration of the at least one process of the particular application from a first one of the host devices that utilizes the given path to a second one of the host devices that does not utilize the given path based at least in part on the mapping.

20. The computer program product of claim 13 wherein the particular application comprises at least one process generating input-output operations directed to a particular one of the storage devices associated with the given path, and wherein the at least one automated action relating to the particular application comprises initiating migration of the at least one process of the particular application from a first one of the host devices that utilizes the given path to a second one of the host devices that does not utilize the given path based at least in part on the mapping.

* * * * *